June 9, 1931. M. VINEYARD 1,809,767
SWEEP RAKE CLEARER
Filed Dec. 17, 1928  4 Sheets-Sheet 1
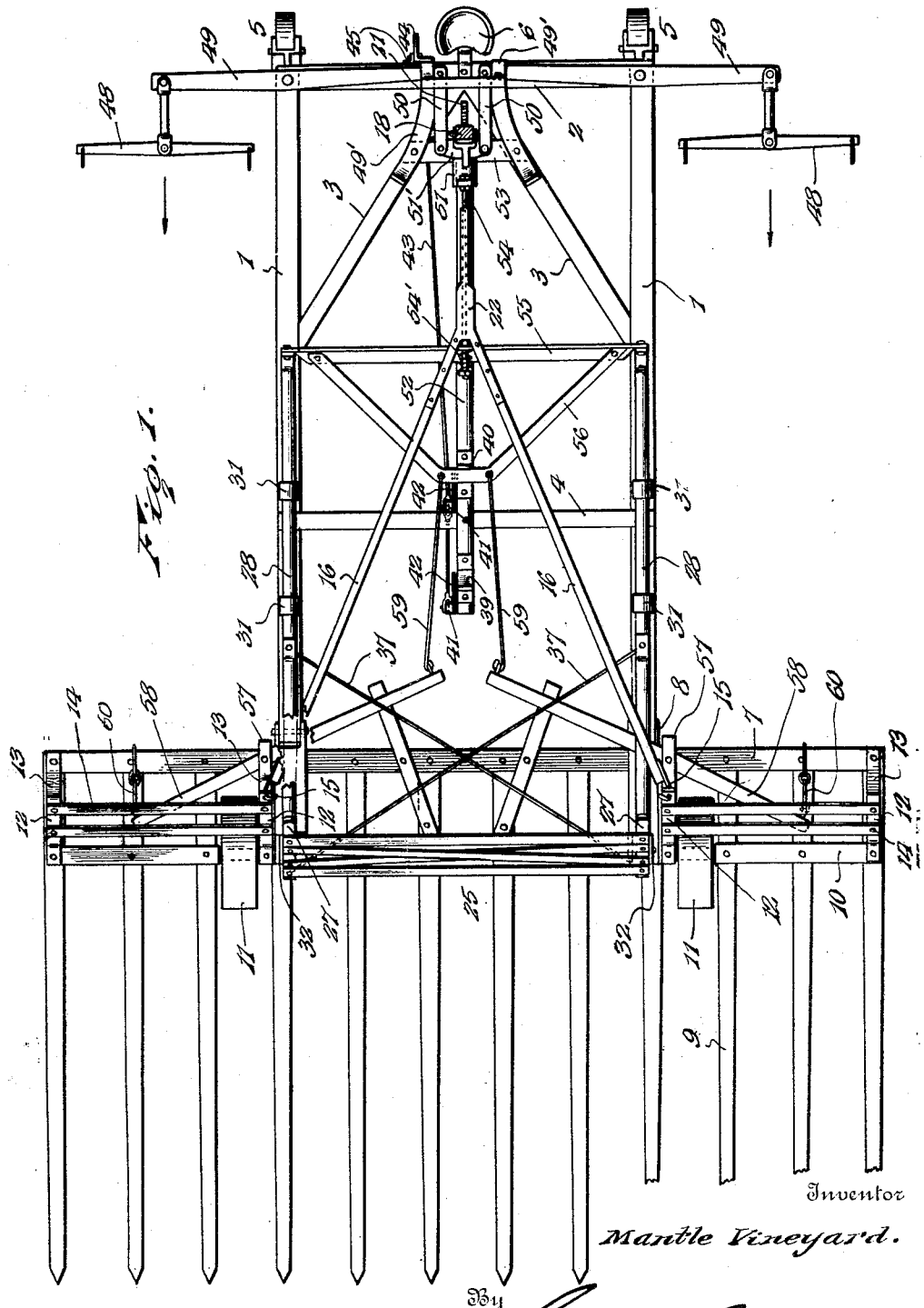
Inventor
Mantle Vineyard.
By Lacey & Lacey, Attorneys

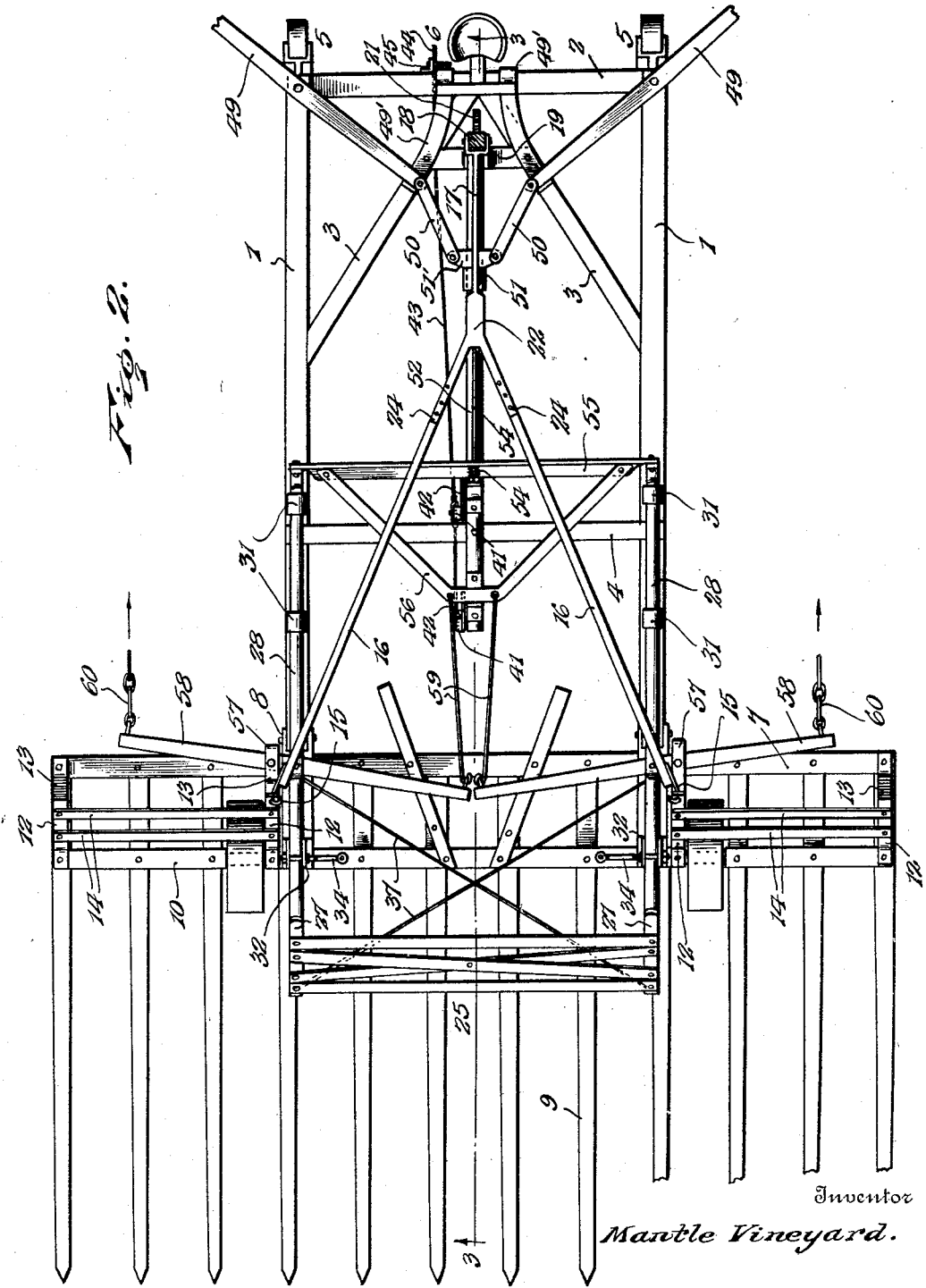

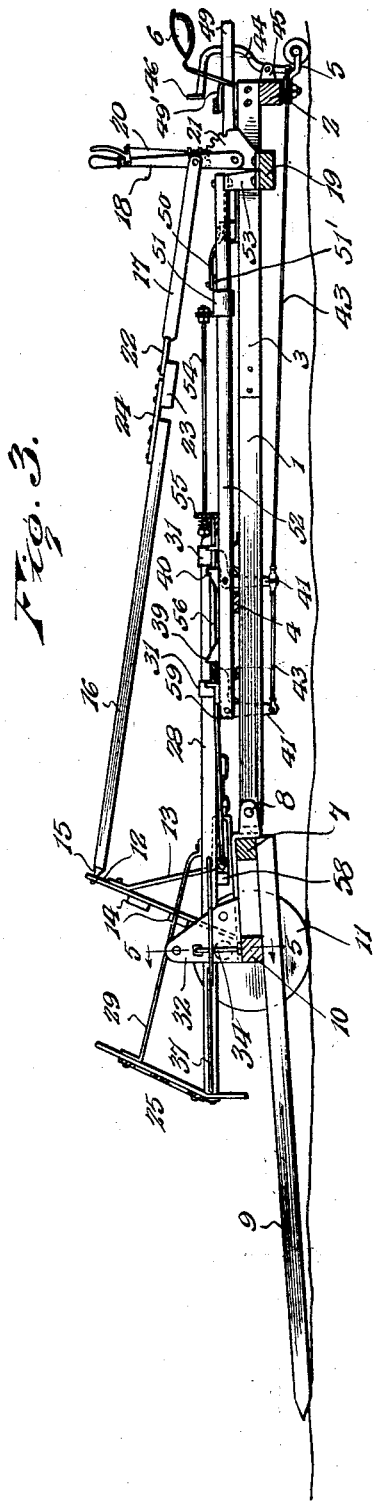

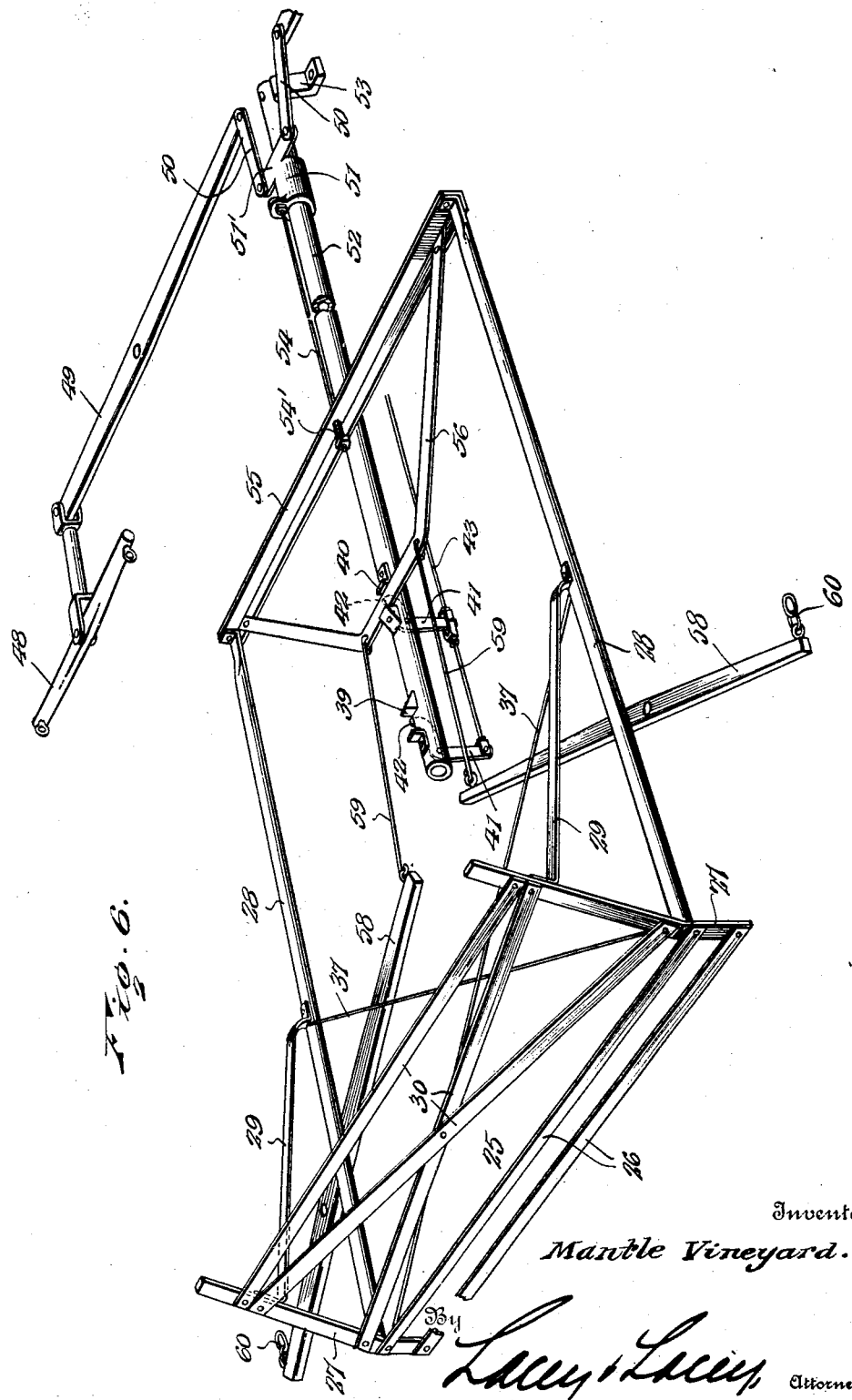

Patented June 9, 1931

1,809,767

UNITED STATES PATENT OFFICE

MANTLE VINEYARD, OF MILLEGAN, MONTANA

SWEEP RAKE CLEARER

Application filed December 17, 1928. Serial No. 326,583.

This invention relates to hay rakes of the header or sweep type and has for its object the provision of novel means for ejecting the hay when the load is to be deposited at a stack or to start the formation of a stack. The invention provides an ejecting mechanism of novel form and simple and inexpensive construction and also provides means whereby the ejecting mechanism may be locked in either its projected or retracted position. The invention is illustrated in the accompanying drawings and will be hereinafter first fully described and then more particularly defined in the appended claims.

In the drawings:

Figure 1 is a plan view of a sweep rake having the invention embodied therein and showing the ejector in its retracted position;

Fig. 2 is a similar view showing the ejector in its projected position;

Fig. 3 is a central longitudinal section on the line 3—3 of Fig. 2;

Fig. 4 is an enlarged detail section showing the means for locking the ejector in a set position;

Fig. 5 is an enlarged detail section on the line 5—5 of Fig. 3, and

Fig. 6 is a perspective view of the ejecting mechanism detached from the main frame of the rake.

The main frame of the rake comprises side bars 1 connected at their rear ends by a cross bar 2 and reinforced by braces 3 extending diagonally between the side bars and said cross bar. There is also a cross bar 4 secured upon the side bars in advance of the rear cross bar 2, as shown in Figs. 1 and 2. At the rear ends of the side bars, casters 5 are mounted to support the rear end of the frame and provide for travel of the same over the field, a seat 6 for the driver being mounted upon the cross bar 2 at the center of the same, as shown. The rake head comprises a rear cross bar 7 to which the front ends of the side bars 1 are hingedly connected, as shown at 8, whereby the rake head may be tilted to take up a load or to sustain a load after it has been taken up. The rake teeth 9 are of the usual construction and are secured at their rear ends to the cross bar 7 and in advance of said cross bar 7 a second cross bar 10 is secured to the rake teeth and extends across the entire width of the rake head, this forward cross bar 10 being constructed at points spaced inwardly from its ends to provide or accommodate bearings for the forward ground wheels 11 which support the rake for travel over the field. Stop frames are provided upon the side portions of the rake head and consist of inclined standards 12 rigidly secured to the forward cross bar 10 and reinforced by braces 13 rising from the rear cross bar 7, rails 14 being secured at their ends to the standards 12 and extending between the same, as shown in Figs. 1 and 2. The outer standards 12 and braces 13 are disposed at the ends of the cross bars 7 and 10 while the inner standards and braces are mounted upon said cross bars adjacent the longitudinal plane of the side bars 1 but at the outer sides of said bars. Connected to the inner standards 12 in any convenient manner, as by hooks 15, are connecting bars 16 which converge rearwardly and are connected at their inner rear ends with a push and pull bar 17 whereby they may be moved longitudinally of the rake to effect tilting of the rake head. The rear end of the push and pull bar 17 is pivoted to a hand lever 18 which is mounted upon a bolster 19 secured to and between the braces 3 and arranged within convenient reach of the driver upon the seat 6. The lever is equipped with a latch 20 of well known form cooperating with a holding rack 21 whereby the lever may be held in a set position. To reduce the cost of manufacture and also provide for differences in the length of the machines, the connecting bars 16 are preferably of wood and the push and pull bar 17 of metal so as to possess the requisite strength, the push and pull bar being formed with a fork 22 at its front end to the under side of which is secured a reinforcing block 23 of wood, and metallic couplings 24 are secured to the upper sides of the connecting bars 16 and the reinforcing block, as shown in Fig. 3. When the hand lever is swung forward to the position shown in Fig. 3, the forward movement will be imparted to the upper ends of the stops and said stops will, consequently, be swung forwardly so that the rake head will be rocked about the bearings of the ground wheels 11 as centers and the front ends of the teeth 9 lowered to the ground to ride under and take up the hay, the pivotal connections between the side bars 1 and the rake head accommodating the movement so that the main frame will remain approximately horizontal. After a load has been taken up, the hand lever 18 is swung rearwardly and a reverse movement imparted to the rake head so that the front ends of the teeth will be lifted and the load will be supported while being transported to the stack or the point where a stack is to be built.

Between the side stops is disposed the ejector stop or gate designated as an entirety by the reference numeral 25 and comprising the lower cross bars 26 secured at their ends to the lower extremities of end bars or posts 27 which are carried by the front ends of slide rods 28 and project above the same, as shown most clearly in Fig. 6, the upper portions of these posts or end bars being reinforced by braces 29 secured upon the slide rods and extending to and secured to the end bars. Above the slide rods, cross bars 30 are secured to and extend between the end bars or posts 27, as clearly shown. The slide rods 28 are located above and over the side bars 1 so that the gate 25 practically fills the space between the side stop members and, when in the retracted normal position, constitutes, in effect, a continuation of the side stops so that the hay which is taken up by the teeth will be held on the teeth and prevented from passing rearwardly over the rake to escape therefrom. The slide rods 28 are supported and guided by bearing brackets 31 secured on the side bars 1 and by U-shaped brackets or stirrups 32 secured upon the rake head preferably directly upon the cross bar 10 of the same. A roller 33 is mounted in and between the sides of the bracket 32 to support the slide rod, as shown clearly in Fig. 5, and said bracket is preferably held against spreading and lateral deflection by a brace 34 secured upon the cross bar 10 and having its upper terminal inserted through the sides of the bracket, as shown at 35, and secured therein, a spacing sleeve 36 being fitted about the terminal between the side members of the bracket so that the parallel relation of the side members will be maintained under all conditions. The terminal 35 and the spacing sleeve 36 are located above the slide rod 28 so that the slide will be held to the roller 33 and, consequently, will be prevented from rising out of the bracket to permit dislodgement of the ejecting gate. The braces 29 of the ejector structure preferably pass through the space at the top of the bracket 32 and struts or guy wires 37 are preferably secured in and extend between the front end portions of the slide rods to maintain the parallel relation of the same. It is frequently desirable to provide gates of different heights or to set the gate to operate at different heights and for this purpose the bracket 32 is provided with a plurality of vertically spaced bearing openings 38 to permit the roller 33 and the bracing terminal 35 to be set at higher or lower points as may be best adapted to any given conditions. When the rake is operating to take up the hay, the gate 25 is retracted so that it is alined with the side stop members transversely of the rake head, and it is held in this position by securing means to be hereinafter described. When the load is to be removed, the gate is to be moved forwardly to the position shown in Figs. 2 and 3 and secured in this position until its return to the position shown in Fig. 1 is desired.

The machine is propelled over the field by draft animals located at the sides of the side bars 1 and at the rear of the rake head and connected by traces or other draft devices to whiffle trees 48 carried by the ends of evener bars 49 pivoted between their ends upon the main frame at the rear ends of the side bars 1.

Stops 49' are provided to limit rearward movement of the inner ends of the eveners. The inner ends of the evener bars 49 are connected by links 50 to a coupling head 51 slidably carried by a bar 52 disposed centrally of the machine longitudinally thereof with its rear end secured to a bracket 53 carried by the bolster 19 and its forward end portion secured upon the cross bar 4. The coupling head 51 is provided at its front side with an upstanding ear to which is secured a forwardly projecting rod 54 which has its front end loosely mounted in a cross bar 55 which is secured to and connects the rear ends of the slide rods 28. Between the bar 55 and a nut at the forward end of the rod is disposed a spring 54' to absorb shocks. An arched bar 56 has its ends secured to the cross bar 55 and projects forwardly with its forward portion crossing the bar 52 and adapted to be selectively engaged in seats 39 and 40 provided upon the upper surface of the bar 52 in order to releasably anchor the bar 55 in a set position. When so anchored, the cross bar and the slide rods 28 will be held stationary and prevented from being moved by strain exerted by the draft animals when the machine is in operation. By this arrangement the gate may be releasably secured in either the position shown in Fig. 1 or that shown in Fig. 2. Levers 41 having arms 42 at their upper ends are pivoted within the bar 52 and these levers are engaged with a rod 43 extending rearwardly and having its rear end connected with a treadle 44 pivoted to a bracket 45 carried by the cross bar 2 of the frame. The treadle has its upper end curved forwardly and terminates in a foot piece 46 upon which the operator places his foot in order to apply pressure to swing the treadle and exert a pull upon the rod 43, thereby swinging the levers 41 to cause their arms 42 to move upwardly and dislodge the anchor bar from the seat 39 or 40 in which it is resting. By this arrangement the anchor bar may be easily released and allowed to move to the other seat. Pivoted between their ends upon the rear cross bar 7 of the rake head and within extensions 57 of the inner braces 13 are backing levers 58, the inner ends of which are connected by links 59 with the cross bar 56 and the outer ends of which carry rings 60 to which martingales or neck yokes of the draft team are to be attached.

When the rake is taking up hay, it is propelled over the field by the draft applied through the whiffletrees 48 and their connections to the main frame of the machine, the whiffletrees and the cooperating parts being then in the position shown in Fig. 1 with the inner ends of the eveners 49 in their rearward positions so that the draft is applied to the main frame through the bolts by which the eveners are pivotally attached to the frame. During this operation of taking up the hay, the backing levers will be in the position shown in Fig. 1, but when a full load has been taken up and has been moved to the point of discharge, the rake is driven as close as possible to the stack and the animals are then backed, the anchor bar 56 being released from the seat 40 as has been described. When the draft animals are backed, the pulling force applied through the whiffletrees 48 and the attached parts will be removed and the strength of the animals will be then applied to the outer ends of the backing levers 58 so that they will be swung about their respective pivots to the position shown in Fig. 2, consequently exerting a pull through the links 59 and the attached parts to the slide rods 28 to project the gate to the position shown in Figs. 2 and 3. Inasmuch as the gate and the rake head are thus caused to move in opposite directions, the load upon the rake teeth will be loosened so that the teeth will be drawn from under the load clear without any of the hay adhering thereto, and it will be understood that, while the gate is shown of less transverse extent than the rake, the portions of the load on the sides of the rake will be naturally so intimately commingled with the central portion of the load that the entire load will be discharged. The rearward movement of the coupling head 51 is limited by contact of the eveners 49 with the abutments 49', as will be understood upon reference to Fig. 1, and the length of the connecting rod or link 54 is such that the nut 61 upon the front end of the same will be disposed in advance of and out of contact with the cross bar 55 when the ejecting gate is in its rearmost position. This lost-motion connection will relieve the draft animals of the sudden strain which would be imposed upon them if, when they were caused to back, a pull were immediately imparted to the coupling head 51 and the evener bars. The first forward movement of the gate and the frame which carries it will be exerted wholly against the load of straw unimpeded by any resistance from the rear draft devices and this will suffice to loosen the load to such a degree that the draft animals may then without excessive strain draw the rake teeth from under the load. When the direction of travel of the animals is again reversed so that they will be driven forward a second time, the backing levers will be permitted to swing easily to their normal positions while the draft will be applied to the parts connected with the whiffletrees 48, and the gate and its frame will be retracted while the animals will be relieved of the shock of the gate abutting against the brackets 32 inasmuch as when rearward movement of the coupling head 51 is stopped, there will still be some rearward movement of the ejecting gate possible and this movement will be imparted thereto by the load taken up. This lost-motion connection also accommodates the tilting movement of the rake head without imparting a breaking strain to the connecting link 54 or the rear portion of the ejecting gate-carrying frame. It should also be noted that when the head or sleeve 51 moves rearwardly, the rear edge or the portion forming the cross bar 51' to which the links 50 are attached will contact with the lever 18, the latch of which will be released and move this lever rearwardly. Therefore, the horses may lift the load and relieve the operator from this labor.

From the foregoing description, taken in connection with the accompanying drawings, it will be seen that I have provided a very simple, compact and easily operated mechanism whereby a load taken up by a sweep rake may be ejected or discharged easily without adhering to the rake teeth so that the rake will be left clear to take up a second load.

Having thus described the invention, I claim:

1. The combination with a sweep rake comprising a main frame, a rake head hingedly connected to the main frame and draft-applying devices mounted upon the rear end of the main frame and including a forwardly projecting connecting rod, of an ejecting gate mounted over the rake head, slide rods carrying said gate and mounted in bearings upon the main frame, a lost-motion connection between the rear ends of the slide rods and the front end of said connecting rod projecting forwardly from the draft devices, and releasable means on the main frame for positively locking the slide rods in either the forward or rearward position.

2. The combination with a sweep rake comprising a main frame, a rake head, and draft devices at the rear end of the main frame, of a coupling head slidably supported and guided by the main frame and connected with the draft devices, a rod extending forwardly from the coupling head, an ejecting gate mounted over the rake head, slide rods carrying the gate and slidably mounted upon the main frame, and a cross bar connecting the rear ends of said slide rods and having a lost-motion connection with the said rod projecting forwardly from the coupling head.

3. The combination with a sweep rake including a main frame, a rake head, and draft-applying devices mounted upon the main frame at the rear end of the same, of a gate mounted over the rake head, slide rods carrying the gate and mounted on the main frame, a cross bar connecting the rear ends of said slide rods, a lost-motion connection between said cross bar and the draft devices, backing levers mounted upon the rake head, and connections between the inner ends of said backing levers and said cross bar.

4. The combination with a sweep rake including a main frame, and a rake head of an ejecting gate mounted over the rake head, a gate frame including slide rods mounted on the main frame and carrying the gate at their front ends and a bridge conecting said rods, draft devices mounted at the rear end of the main frame and connected with said bridge to normally maintain the gate frame in a retracted position, draft devices connected with the bridge and operable to move the same forward, a center bar extending longitudinally of the main frame beneath said bridge and provided with seats to receive a portion of the bridge to releasably hold the gate frame in adjusted positions, and means for engaging the bridge and moving the same out of the seats to allow movement of the gate frame.

5. The combination with a sweep rake including a main frame, and a rake head, of an ejecting gate mounted over the rake head, a frame carrying the gate and including side bars slidably mounted on the main frame, a cross bar connecting the side bars, and an anchor bar extending forwardly from the cross bar, draft devices mounted on the main frame and the rake head respectively and operatively connected respectively with the cross bar and anchor bar to move the gate to projected and retracted positions, a center bar of the gate-carrying frame extending longitudinally of the main frame and provided with seats to receive the anchor bar of the gate-carrying frame and hold the same in either projected or retracted position, levers pivoted to the center bar adjacent the seats and adapted to engage the anchor bar and unseat the same to release the gate-carrying frame, a pedal on the main frame, and a rod connecting the pedal with the levers whereby the levers may be moved to release the gate carrying frame.

6. The combination with a sweep rake comprising a main frame, a rake head, and draft-applying devices on the rake head and at the rear end of the main frame respectively, of an ejecting gate mounted over the rake head, a frame carrying the gate and slidably mounted on the main frame, a connection between the gate-carrying frame and the draft devices on the rake head, a lost-motion connection between the rear end of the gate-carrying frame and the draft-applying devices at the rear of the main frame, and releasable means for locking the gate in either the forward or the rearward position.

7. The combination with a sweep rake comprising a main frame, and a rake head, of an ejecting gate mounted over the rake head, a frame carrying the gate and slidably mounted on the main frame, draft devices at the front and rear of the main frame and connected with the gate-carrying frame to project or retract the gate, and means to retain the gate in either its projected or retracted position.

8. The combination with a sweep rake comprising a main frame, and a rake head, of an ejecting gate mounted over the rake head, a frame carrying the gate and slidably mounted on the main frame, draft-applying devices on the main frame connected with the gate-carrying frame to project or retract the gate, seats on the main frame to be engaged by the gate-carrying frame to hold the gate in projected or retracted position, and means to release the gate-carrying frame from the engaged seat.

9. The combination with a sweep rake comprising a main frame, and a rake head, of an ejecting gate mounted over the rake head, a frame carrying the gate and slidably mounted on the main frame, draft-applying devices on the main frame connected with the gate-carrying frame to project or retract the gate, seats on the main frame to be engaged by the gate-carrying frame to hold the gate in projected or retracted position, levers adjacent the respective seats to release the gate-carrying frame from the engaged seat, and means to actuate said levers.

In testimony whereof I affix my signature.

MANTLE VINEYARD. [L. S.]